May 12, 1964  J. P. BORGES  3,133,239

TEMPERATURE COMPENSATED CONTROLLED RELAY

Filed April 7, 1960

INVENTOR.
JAMES P. BORGES

BY Oldham & Oldham

ATTYS.

United States Patent Office 3,133,239
Patented May 12, 1964

3,133,239
TEMPERATURE COMPENSATED CONTROLLED RELAY
James P. Borges, North Olmsted, Ohio, assignor to Hertner Electric Company, Cleveland, Ohio, a corporation of Ohio
Filed Apr. 7, 1960, Ser. No. 20,720
2 Claims. (Cl. 320—30)

The present invention relates to relays and especially to control circuits for relays primarily adapted for use with a power supply, or load which varies with time and/or the ambient temperature and where the control circuit for the relay provides temperature compensation to provide relay actuation at corresponding voltages at different operating temperatures.

Relays of the type to which the present invention relates can be used in various manners, but one particular use for these relays is in the control of charging circuits for batteries. In battery charging actions, the volts across each cell of the batteries being charged will gradually increase over the initial hours of the charge and will then normally rise rapidly at about the point in the charging cycle where gassing starts to occur in the cells, or shortly before such time when gassing starts. It is desirable to set the power supply on a timed cycle to these batteries being charged at about this gassing point in the charging cycle to insure that proper finish charge conditions are present in the battery charging circuit.

A further factor involved in battery charging operations is that the maximum voltage per cell, and the voltage of the cell decrease with increase in the ambient temperature.

In view of the above, it is a general object of the present invention to provide a novel and improved controlled relay wherein the controlled relay has, forming an operative part thereof, a temperature compensated control circuit characterized by having a negative temperature coefficient characteristic.

Another object of the invention is to sense a voltage change in a circuit and to effect a control action in such circuit or another circuit because of such voltage change.

Another object of the invention is to provide a controlled relay that will be actuated under uniform repetitive conditions at different times and under different operating voltages at different ambient temperatures.

A further object of the invention is to provide a controlled relay for use in a battery charging circuit where the voltages of the batteries being charged decrease with temperature increase but also increase as the charge cycle progresses and to use such battery voltage for circuit control action.

Another object of the invention is to use a zener diode in a special control circuit for a relay and where the zener diode may have some insignificant current normally flowing therethrough, but where the zener diode has a firing voltage which, when supplied thereto, will cause a current to flow freely through the zener diode for at least an instant and reduce the effective resistance of the zener diode at that time to substantially zero.

The foregoing and other objects and advantages of the invention will be made more apparent as the specification proceeds.

Reference now should be had to the accompanying drawing wherein one currently preferred embodiment of the principles of the invention is shown and where:

When referring to corresponding members shown in the drawings and referred to in the specification, corresponding numerals are used to facilitate comparison therebetween.

In general, the control apparatus of the relay of the invention includes a circuit connected to and sensing voltage of a D.C. load that varies with time and ambient temperature. This control circuit includes a series system of an operating coil for the relay, a thermistor and some conductive electrical member having a firing voltage, such as a zener diode, and a resistance means connected in parallel with the zener diode and also a resistance in parallel with the thermistor. The primary voltage drop in this circuit is normally across the zener diode and its parallel resistance. When the D.C. sensing voltage increases to a determined value, the zener diode is fired to decrease its resistance and voltage to substantially zero and thus increase the voltage at the operating coil of the relay sufficiently to close the actuating current relay contacts thus placing the power charging circuit on a predetermined timed cycle.

Figure 1:
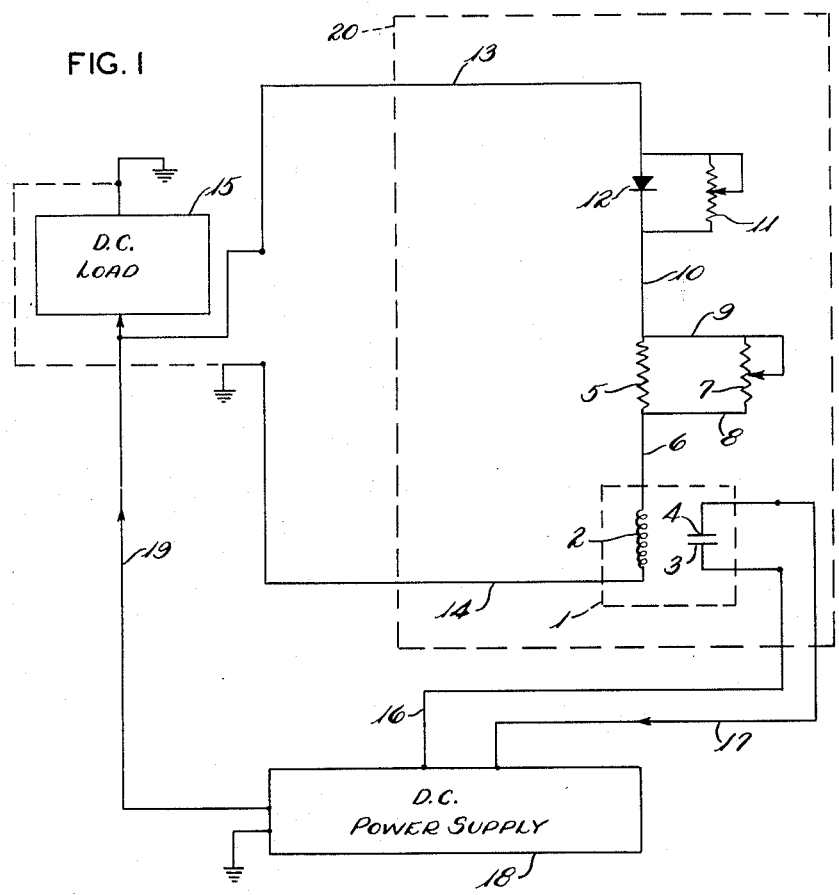
FIG. 1 is a more detailed circuit diagram of the relay of the invention.

With reference to the details of the invention as shown in FIG. 1, a relay 1 to be controlled by the novel control system and circuit of the invention is shown in the drawing and it is provided with an operating coil 2. The relay controls suitable contacts 3 and 4 that have leads extending therefrom and extending to the circuit to be controlled, such as a power supply means for a battery charging system. These contacts 3 and 4 may be normally open or normally closed, as desired, and several sets of contacts may be controlled by the relay 1, if desired. Obviously any control action desired may be provided by relay actuation.

In series with the relay 1 is a thermistor 5 that connects to the relay coil by a lead 6. A variable resistance 7 is connected in parallel with the thermistor 5 by leads 8 and 9 and the characteristics of the thermistor 5 and variable resistance 7 are such that they form a negative temperature coefficient resistance circuit. Such circuit responds to the condition of ambient temperature to vary the resistance provided in the relay control circuit to compensate for action in the D.C. load circuit where the D.C. load has a characteristic function that decreases in voltage with the increase in temperature, as in battery charging circuits.

A lead 10 connects a parallel circuit formed between a resistance 11 and an electrical control member having a firing voltage, in this instance a zener diode 12, in the series circuit. The zener diode normally has a very small, insignificant current flowing therethrough under normal operating conditions in the control circuit for the relay 1. However, the characteristics of the zener diode 12 are so correlated with relation to the other characteristics of the members in the control circuit, and to the D.C. load, that after a passage of some time, when the voltage of the D.C. load normally will rise appreciably, sufficient voltage is supplied to the zener diode 12 as to cause it to fire. When the zener diode 12 fires, in effect, it reduces its resistance and voltage and that of the parallel circuit formed between the zener diode 12 and resistance 11 to substantially zero. At such time, then the primary voltage drop in the control circuit of the invention is transferred over to the relay coil 2, and a large enough current flows therethrough as to actuate such relay and change the setting of the contacts 3 and 4.

Other leads 13 and 14 connect the parallel circuit of the resistance 11 and zener diode 12 and the one terminal on the coil 2, respectively, to a source of D.C. voltage which is the voltage present at a D.C. load 15, which load voltage varies with time and decreases with increase in temperature.

In a battery charging system, the voltage 15 may be taken directly from, or be proportional to that of the batteries being charged and this voltage 15 would be relatively small initially and would progressively advance as the charging cycle proceeds. However, when a sufficient increase in the voltage level of the individual cells in the battery or batteries being charged is obtained, then a large enough voltage is supplied to the relay control circuit of the invention as to cause the firing of the zener diode 12, as herein outlined.

A D.C. power source 18 connects to the contacts 3 and 4 by leads 16 and 17 for control of the power supply when the relay 1 is actuated. Lead 19 connects the power source 18 to the D.C. load 15. The D.C. circuits are completed by grounding the negative terminals of the coil 2, power supply 18 and D.C. load 15.

Figure 2:
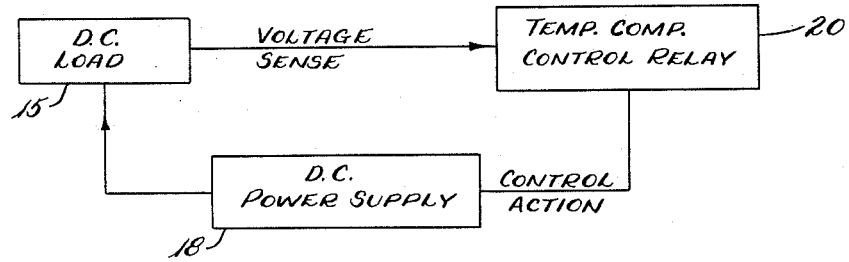
FIG. 2 is a box diagram of a typical use circuit of a temperature compensated controlled relay of the invention.

The relay 1 and its controls cooperate to form a temperature compensated controlled relay 20. FIG. 2 shows how the voltage sense from the D.C. load connects to the relay 20 to actuate it and effect a desired action in the power supply 18.

From the foregoing, it will be seen that the relay of the invention has a control circuit provided therefor wherein the ambient temperature condition is critical and such control circuit properly coordinates the increase or charge in temperature that may occur in battery charging operations with the increase in voltage output of each cell with increased charging time. The resistance in the relay control circuit will decrease with temperature increase to compensate for the reduced cell volts obtained at the increase in ambient temperature. Hence, the relay 1 can be actuated under corresponding conditions in a battery charging cycle regardless of temperature changes.

In one circuit of the invention, for example, the D.C. volts supplied at the load 15 was 15.2 volts at 0° C., 14.2 volts at 25° C. and 13.2 volts at 50° C. The relay operating coil 2 had 1300 ohms resistance, the thermistor 5 had 1000 ohms resistance at 25° C. and the variable resistance 7 could be varied between 0 and 750 ohms. The fixed resistance 11 had 2,000 ohms resistance, and the zener diode 12 was of conventional construction.

The zener diode is relatively inexpensive to purchase and has very good repetitive operating characteristics. The zener diode, it will be seen, in effect really operates as a switch to close and permit current flow therethrough when a predetermined operating voltage is reached. The zener diode has almost an infinite resistance below its threshold, or firing voltage so that an insignificant current flow passes therethrough below such operating voltage. Naturally the characteristics of the thermistor used are selected for voltage and temperature conditions to which the control circuit of the invention will be subjected.

It will be noted that the D.C. control voltage can be obtained from any suitable source and that a control action can be provided with changes in such D.C. voltage to produce a control or change action in the controlled circuit.

Variations in the circuit of the invention such as removing the potentiometer 7, adding a series resistance thereto, change of the resistances and voltages of the circuit, etc. may be made as required by the voltage sense system and by the controlled circuit.

In view of the foregoing, it is believed that a novel controlled relay has been provided by the invention and that excellent temperature compensated controlled relay action can be obtained by the apparatus and control circuit of the invention.

While one complete embodiment of the invention has been disclosed herein, it will be appreciated that modification of this particular embodiment of the invention may be resorted to without departing from the scope of the invention as defined in the appended claims.

What is claimed is:

1. In a battery charging system wherein a battery is to be charged from a D.C. power supply, the voltage of the battery being charged decreasing with temperature increase but increasing as the charging cycle progresses, a control circuit connected to and sensing the varying voltage of the battery with time and temperature to actuate the power supply during the charging cycle comprising;

a relay coupled to the power supply including contacts controlled by a coil;

a thermistor and a variable resistance in a first parallel circuit forming a negative temperature coefficient resistance circuit coupled to one end of said coil;

a zener diode and resistance in a second parallel circuit in series with said first parallel circuit and said coil; and, series leads connecting said parallel circuits and the other end of said coil across said battery, whereby the resistance in the control circuit will decrease with a temperature increase to compensate for the reduced battery voltage caused by increase in temperature.

2. A control circuit as claimed in claim 1, said series leads going from said second parallel circuit and the other end of said coil across said battery.

References Cited in the file of this patent

UNITED STATES PATENTS

| | | |
|---|---|---|
| 2,769,131 | Immel | Oct. 30, 1956 |
| 2,866,944 | Zelina | Dec. 30, 1958 |
| 2,987,654 | Voss | June 6, 1961 |